UNITED STATES PATENT OFFICE.

NILS TESTRUP AND MATTHEW ATKINSON ADAM, OF LONDON, ENGLAND, AND THOMAS RIGBY AND GEORGE W. ANDREW, OF DUMFRIES, SCOTLAND, ASSIGNORS TO WET-CARBONIZING LIMITED, OF LONDON, ENGLAND.

PROCESS FOR UTILIZING THE LIQUID ASSOCIATED WITH PEAT.

1,145,095.   Specification of Letters Patent.   Patented July 6, 1915.

No Drawing.   Application filed January 27, 1914.   Serial No. 814,717.

*To all whom it may concern:*

Be it known that we, NILS TESTRUP, a subject of the King of Great Britain and Ireland, and residing at 3 Dean Farrar street, Westminster, London, S. W., England; MATTHEW ATKINSON ADAM, a subject of the King of Great Britain and Ireland, and residing at 57 Lincoln's Inn Fields, London, W. C., England; THOMAS RIGBY, a subject of the King of Great Britain and Ireland, and residing at 61 Loreburn street, Dumfries, Scotland, and GEORGE WILLIAM ANDREW, a subject of the King of Great Britain and Ireland, and residing at 61 Loreburn street, Dumfries, Scotland, have invented a certain new and useful Improved Process for Utilizing the Liquid Associated with Peat, of which the following is a specification.

This invention relates to improvements in processes for the utilization of peat by heat treatment. Processes of this kind depending as they do upon some chemical change in the material, induced by heat or other agency, or both, to render the water of the peat more freely expressible cause some of the solid matters to pass into the solution and this is particularly so in the Ekenberg process to which the present invention more especially pertains. This process is described as also modifications to which our invention is more particularly applicable in British Patents Numbers 10834 and 20420 of 1903, 17610 of 1911 and 17427 of 1912. In carrying out this process we have found that the effluent from presses and the like in which the treated material is dewatered contains, besides substantial quantities of organic acids (some volatile) and sugary matters, caramel or the like, an appreciable and often important part of the nitrogenous matter of the peat solids, some substantial portion of which exists as volatile nitrogenous bases *e. g.* ammonia. Moreover we have observed that under different conditions of operation *e. g.* with variation of time or temperature of heating, initial acidity or otherwise of the raw material this source of loss is widely affected. Thus we have found that higher working temperatures lead to higher nitrogen contents in the effluent as instanced by the case of a peat which when heated for twenty minutes at 170° C. yielded 20% of its nitrogen to the liquid, some 14% appearing in the solids obtained by desiccation of the liquid and which when heated on the other hand to 180° C. for twenty minutes yielded up 26% of its nitrogen that in solution representing 19% while in the first case quite 4% of the nitrogen of the peat solids was liberated in one form or another as volatile compound on treating the effluent solids with alkali. According to the present invention this loss of nitrogenous matter, such as ammonium compounds is avoided and in some cases turned to advantage the effluent being concentrated to render its solids available for gasification and by-product recovery from the gases and the conditions under which the peat treatment is carried on being in some cases modified so as actually to increase the proportion of materials passing into solution. In this way not only is undue loss of valuable products in the effluent avoided but where, for instance, the object of the peat treatment is to produce fuel-briquets—the latter can be deprived of a considerable portion of products—for example, ammonium compounds—which to the fuel consumer are of no interest but if saved in the fuel preparing process represent a considerable source of revenue and cheapen the cost of fuel production.

In carrying out the invention for instance in one way using any of the methods set out in the patents and applications referred to, the effluent from the peat, the gases escaping from which can be treated for any ammonia they contain, is treated for recovery from it of volatile nitrogen compounds and acids it contains as well as to free it from residual dissolved gases, chiefly carbon dioxid, which could interfere with the subsequent evaporation. This treatment may take the form of simple distillation to recover volatile acids or distillation to recover ammonia after addition of lime or alkali to liberate the same and incidentally to fix the carbon dioxid, or both treatments may be carried out although it is often convenient during the evaporation which is best carried out according to the method of British Patents 12462 or 22670/11 (Soderlund) to treat the steam evolved for acids or ammonia by passing the steam through an absorbent liquid in one or more washers maintained at the right concentration and temperature to prevent steam condensing therein and if necessary externally heated for this purpose. When the material by such treatment has been freed of its recoverable acids and ammonia and concentrated to say a water content of between 50% and 60%, it can be passed straight from the evaporator, it being then in a syrupy condition, to a gas producer of the peat plant in which peat is being gasified to yield power and fuel gas as well as to yield up its nitrogen in by-product recovery plant. The syrup can be pumped in definite quantities into the producer and its solids being of good calorific value contribute their share in the heat balance of the process yielding under favorable circumstances practically enough heat to balance that consumed for the evaporation and their nitrogenous matter is recovered along with that of the main bulk from the peat. On the other hand the liquid may be concentrated more or less to dryness (say 5% moisture content) and mixed in with the peat before consolidation for gasification or consolidated to yield blocks of material to be mixed with the other fuel gasified.

The material before gasification may be treated for the recovery of other or additional matters than those described such as sugars and by fermentation alcohol, and the residue then gasified.

Having now described our invention, what we claim as new and desire to secure by Letters Patent is:—

1. A process for utilizing the liquid associated with peat, in which the peat is subjected to heat treatment rendering said liquid expressible, then pressed, and the separated liquid concentrated to evaporate the bulk of the water it contains, the concentrated residue gasified and the ammonia produced in gasification separated from the gases; as set forth.

2. A process for utilizing the liquid associated with peat in which the peat is heated to a high temperature under pressure preventing ebullition and the liquid separated from the peat by pressure, concentrated to a syrupy consistency, admixed with consolidated wet carbonized peat and the mixture gasified with by-product recovery from the gases; as set forth.

3. A process for utilizing the liquid associated with peat in which the peat is wet carbonized under such conditions as to yield a large proportion of its nitrogenous matter to the associated liquid, the peat and the liquid are then separated, the latter concentrated and gasified with a portion of the peat, and the nitrogenous matter recovered from the gases generated.

4. A process for utilizing the liquid associated with peat in which the peat is wet carbonized, then pressed, the volatile acids and ammonia then separated from the liquid matters associated with the peat, the liquid matters concentrated to a syrupy consistency and the syrup gasified with by-product recovery to yield up the remainder of the nitrogenous matter; as set forth.

In testimony whereof we have signed our names to this specification in the presence of two subscribing witnesses.

NILS TESTRUP.
M. ATKINSON ADAM.
T. RIGBY.
G. W. ANDREW.

Witnesses to the signature of Nils Testrup:
BERTRAM H. MATTHEWS,
R. E. ELDRIDGE.

Witnesses to the signature of Matthew Atkinson Adam:
BERTRAM H. MATTHEWS,
WILLIAM H. BIRD.

Witnesses to the signatures of Thomas Rigby and George William Andrew:
H. DUNWORTH,
J. M. BURKE.

Copies of this patent may be obtained for five cents each, by addressing the "Commissioner of Patents, Washington, D. C."